United States Patent
Rune et al.

(10) Patent No.: US 10,904,860 B2
(45) Date of Patent: Jan. 26, 2021

(54) SUPPORTING OR PERFORMING DISTRIBUTION OF A PAGING MESSAGE

(71) Applicant: Telefonaktiebolaget LM Ericsson (publ), Stockholm (SE)

(72) Inventors: Johan Rune, Lidingö (SE); Icaro L. J. Da Silva, Solna (SE); Gunnar Mildh, Sollentuna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/321,931

(22) PCT Filed: Aug. 16, 2016

(86) PCT No.: PCT/SE2016/050759
§ 371 (c)(1),
(2) Date: Jan. 30, 2019

(87) PCT Pub. No.: WO2018/034600
PCT Pub. Date: Feb. 22, 2018

(65) Prior Publication Data
US 2019/0182803 A1   Jun. 13, 2019

(51) Int. Cl.
*H04W 68/02* (2009.01)
*H04W 68/00* (2009.01)
(Continued)

(52) U.S. Cl.
CPC .......... *H04W 68/02* (2013.01); *H04B 7/0619* (2013.01); *H04B 7/0621* (2013.01);
(Continued)

(58) Field of Classification Search
CPC ... H04W 68/02; H04W 60/00; H04W 68/005; H04W 68/08; H04W 76/27; H04W 76/28;
(Continued)

(56) References Cited

U.S. PATENT DOCUMENTS 9,198,083 B1   11/2015   Rai et al.
2008/0233949 A1*   9/2008   Voyer .............. H04W 24/02
                                                        455/424

(Continued)

FOREIGN PATENT DOCUMENTS

GB         2513182 A       10/2014
WO    WO 2011/026663 A2    3/2011
(Continued)

OTHER PUBLICATIONS

International Search Report and Written Opinion of the International Searching Authority, PCT/SE2016/050759, dated Apr. 24, 2017, 8 pages.

(Continued)

*Primary Examiner* — Fred A Casca

(74) *Attorney, Agent, or Firm* — Sage Patent Group

(57) ABSTRACT

A wireless device, a first network node and methods therein, for supporting or performing distribution of paging messages within a Radio Access Network Area, RANA, of a wireless network. The wireless device collects RANA related information from network nodes visited by the wireless device. The RANA related information indicates which RANAs are supported by the respective network nodes. A list of network nodes that support a RANA is extracted from the collected RANA related information, and the list is sent to the first network node to enable distribution of paging messages by the first network node within the RANA.

14 Claims, 4 Drawing Sheets

(51) Int. Cl.

| | |
|---|---|
| *H04W 72/04* | (2009.01) |
| *H04W 76/27* | (2018.01) |
| *H04W 36/00* | (2009.01) |
| *H04W 76/28* | (2018.01) |
| *H04W 72/12* | (2009.01) |
| *H04W 84/04* | (2009.01) |
| *H04W 4/02* | (2018.01) |
| *H04L 29/06* | (2006.01) |
| *H04L 5/22* | (2006.01) |
| *H04B 7/06* | (2006.01) |
| *H04B 7/08* | (2006.01) |
| *H04W 40/00* | (2009.01) |
| *H04W 16/32* | (2009.01) |
| *H04B 7/10* | (2017.01) |
| *H04L 29/12* | (2006.01) |
| *H04L 5/00* | (2006.01) |
| *H04L 1/06* | (2006.01) |
| *H04B 7/12* | (2006.01) |
| *H04B 7/22* | (2006.01) |
| *H01Q 1/24* | (2006.01) |
| *H01Q 13/02* | (2006.01) |
| *H01Q 25/00* | (2006.01) |
| *H01Q 1/28* | (2006.01) |
| *H01Q 9/18* | (2006.01) |
| *H01Q 1/00* | (2006.01) |
| *H01Q 21/22* | (2006.01) |

(52) U.S. Cl.
CPC ......... *H04B 7/0626* (2013.01); *H04B 7/0628* (2013.01); *H04B 7/0632* (2013.01); *H04B 7/0634* (2013.01); *H04B 7/0636* (2013.01); *H04B 7/0697* (2013.01); *H04B 7/08* (2013.01); *H04B 7/10* (2013.01); *H04L 5/22* (2013.01); *H04L 61/1541* (2013.01); *H04L 65/1073* (2013.01); *H04W 4/027* (2013.01); *H04W 16/32* (2013.01); *H04W 36/0016* (2013.01); *H04W 36/0061* (2013.01); *H04W 40/00* (2013.01); *H04W 68/00* (2013.01); *H04W 68/005* (2013.01); *H04W 68/025* (2013.01); *H04W 72/042* (2013.01); *H04W 72/1289* (2013.01); *H04W 76/27* (2018.02); *H04W 76/28* (2018.02); *H04W 84/042* (2013.01); *H01Q 1/007* (2013.01); *H01Q 1/246* (2013.01); *H01Q 1/288* (2013.01); *H01Q 9/18* (2013.01); *H01Q 13/02* (2013.01); *H01Q 21/22* (2013.01); *H01Q 25/00* (2013.01); *H04B 7/12* (2013.01); *H04B 7/22* (2013.01); *H04L 1/06* (2013.01); *H04L 1/0612* (2013.01); *H04L 1/0687* (2013.01); *H04L 1/0693* (2013.01); *H04L 5/0007* (2013.01); *Y02D 30/70* (2020.08)

(58) Field of Classification Search
CPC ............ H04W 68/025; H04W 72/042; H04W 72/1289; H04W 36/0016; H04W 36/0061; H04W 4/027; H04W 84/042; Y02D 70/1262; Y02D 70/1242; Y02D 70/164; Y02D 70/24; Y02D 70/21; Y02D 70/1224; H04L 5/0007; H04L 65/1073
See application file for complete search history.

(56) References Cited

U.S. PATENT DOCUMENTS

| | | | |
|---|---|---|---|
| 2010/0029298 A1* | 2/2010 | Iwamura | H04W 24/08 455/456.1 |
| 2010/0159885 A1* | 6/2010 | Selgert | G01S 5/0226 455/412.1 |
| 2011/0300867 A1* | 12/2011 | Matsuo | H04W 36/00835 455/436 |
| 2014/0155109 A1* | 6/2014 | Vaidya | H04W 8/06 455/458 |
| 2014/0206349 A1* | 7/2014 | Bertrand | H04W 48/18 455/434 |
| 2015/0149524 A1* | 5/2015 | Nishikawa | H04L 67/145 709/201 |
| 2015/0156615 A1* | 6/2015 | Gao | H04W 52/0212 455/414.3 |
| 2015/0215895 A1* | 7/2015 | Iwai | H04W 68/04 455/458 |
| 2016/0050544 A1* | 2/2016 | Chandramouli | H04W 4/08 370/312 |
| 2016/0100378 A1* | 4/2016 | Chang | H04W 64/003 455/456.5 |

FOREIGN PATENT DOCUMENTS

| WO | WO 2012/039650 A1 | 3/2012 |
|---|---|---|
| WO | WO 2018/017002 A1 | 1/2018 |

OTHER PUBLICATIONS

On RAN Initiated Paging, 3GPP TSG-RAN WG2 Meeting #94, Nanjing, China, May 23-27, 2016, Huawei, HiSilicon, China Telecom, R2-163932, 5 Pages.

Benefits and impacts analysis for paging initiated by RAN, Samsung, 3GPP TSG-RAN WG3 #92, Nanjing, P.R. China, May 23-27, 2016, R3-161086, 5 Pages.

Report of 3GPP TSG RAN WG3 meeting #92, Nanjing, China, May 23-27, 2016, TSG-RAN Working Group 3 meeting #93, Gothenburg, Sweden, Aug. 22-26, 2016, R3-161546, 123 Pages.

Nokia, Alcatel-Lucent Shanghai Bell, Paging for light connection, 3GPP TSG-RAN WG2 Meeting #94, Nanjing, China, May 23-27, 2016, R2-163888, 5 Pages.

\* cited by examiner

| RANA 1 | Contact info |
|---|---|
| Node 11 | C 11 |
| Node 12 | C 12 |
| Node 13 | C 13 |
| ... | |

| RANA 1 | Contact info 1 | RANA 2 | Contact info 2 | RANA 3 | Contact info 3 |
|---|---|---|---|---|---|
| Node 11 | C 11 | Node 21 | C 21 | Node 31 | C 31 |
| Node 12 | C 12 | Node 22 | C 22 | Node 32 | C 32 |
| Node 13 | C 13 | Node 23 | C 23 | Node 33 | C 33 |
| ... | | ... | | ... | |

SUPPORTING OR PERFORMING DISTRIBUTION OF A PAGING MESSAGE

CROSS REFERENCE TO RELATED APPLICATIONS

This application is a 35 U.S.C. § 371 national stage application of PCT International Application No. PCT/SE2016/050759 filed on Aug. 16, 2016, the disclosure and content of which is incorporated by reference herein in its entirety.

TECHNICAL FIELD

The present disclosure relates generally to a wireless device, a first network node and methods therein, for supporting or performing distribution of a paging message within a Radio Access Network Area, RANA, of a wireless network.

BACKGROUND

The term "wireless network" is used in this description to denote any network comprising network nodes such as base stations, access points, eNodeBs or the like which are capable of radio communication with wireless devices. The term "Radio Access Network, RAN" may be used interchangeably throughout this disclosure instead of wireless network. The nodes in the network that performs such radio communication with wireless devices are also generally denoted "network nodes" herein. The term "radio access node" may be used interchangeably throughout this disclosure instead of network node. The wireless network or RAN may further be connected to a Core Network, CN.

Further, the term "wireless device" denotes any communication equipment that is capable of radio communication with a wireless network, i.e. with network nodes comprised in a Radio Access Network, RAN, part of the wireless network. Some non-limiting examples of wireless devices that may be involved in the procedures described herein include mobile phones, smartphones, tablets, laptop computers and Machine-to-Machine, M2M, devices.

One of the main states for a wireless device in a Long Term Evolution, LTE, wireless network is the so-called idle mode, where the wireless device is unknown in the RAN, although it has a context (i.e. information/data related to the wireless device) in a Core Network, CN, part of the wireless network to enable the wireless device to be contacted, e.g. for receiving data. In this idle mode or state, a list of Tracking Areas has been allocated to the wireless device by the CN. The wireless device is commonly configured to inform the CN when it enters a Tracking Area that is not in the list by sending an updating message referred to as a Tracking Area Update Request to the network. This way the CN is able to keep track of where the wireless device is located with the accuracy of a Tracking Area List. When the CN needs to contact the wireless device, e.g. when there is some data to be delivered to the wireless device, the CN initiates paging of the wireless device in the Tracking Areas that are included in the wireless device's assigned list of Tracking Areas.

When the wireless device needs to contacted and paged, the CN is responsible for distributing a paging message to the network nodes that support the Tracking Areas that are included in the wireless device's assigned Tracking Area list. These network nodes will then transmit the paging message at predictable, partly device specific, paging occasions so that the wireless device is able to receive the message from at least one of the transmitting network nodes depending on where the device is located. To enable this procedure, each network node needs to inform the MME(s) about which Tracking Area(s) it supports, e.g. when an S1-MME interface is established. Hence, when a certain wireless device is to be paged the MME can find out which network nodes a paging message should be distributed to, that is according to the Tracking Area list.

This procedure is illustrated in FIG. 1 where a wireless device D1 sends tracking area updating messages to an MME or anchor node 100, e.g. at regular intervals or whenever the device D1 moves into a new Tracking Area, TA, as illustrated by an action 1:1. In another action 1:2, the MME or anchor node 100 receives data directed to the wireless device D1 and finds the TA, in another action 1:3, in which the wireless device D1 is presumably present according to its latest tracking area updating message, in this example TA 1. The MME or anchor node 100 then distributes a paging message to the network nodes 102 that belong to TA 1, in a following action 1:4, which effectively instructs or enables the network nodes 102 in TA 1 to perform radio transmission of the paging message. A final action 1:5 illustrates that the paging message is accordingly transmitted from the network nodes 102 in TA 1.

It is likely that future wireless networks, e.g. networks configured according to the fifth Generation, 5G, will employ a RAN state similar to the above described non-connected idle mode in view of the wireless device, but in which the wireless device is connected in view of the CN, hence the CN does not view the wireless device as idle. In this mode or state, the RAN handles the paging and receives area updates from the wireless device. Such a state is also likely to be introduced in LTE as well, in order to facilitate tight integration of LTE and 5G networks. This state may also be referred to as "dormant state" and in this description an area assigned to the wireless device e.g. for paging purposes is referred to as a "RAN Area, RANA". The dormant state may be used instead of the idle mode in 5G or it may exist in parallel with the idle mode, such that the dormant state and the idle mode may complement each other.

In the dormant state there will be an anchor node, which could be one of the network nodes in the RAN, that maintains the wireless device's associated connection(s) with the CN, such as any control and user plane S1 connections. This anchor node will also be responsible for initiating and distributing paging messages among the network nodes which the wireless devices may listen to in their current RANA when in the dormant state.

Since the RAN handles the paging procedures in such networks, it needs to keep track of which network nodes belong to and support the same RANA. This is needed for enabling paging in relevant areas and may also be useful for retrieval of device context during page response and network access initiated by the wireless device when in the dormant state. The term "device context" here refers to information/data related to the wireless device, wherein this information/data may be static and/or dynamic. Information related to the capabilities or subscription associated with the wireless device are examples of static information, while established bearers, recent mobility statistics and last known location are examples of dynamic information. Throughout this description, a network node supporting a RANA means that the network node belongs to the RANA. Each network node should thus preferably be aware of all the other network nodes that belong to the same RANA and optionally also have a connection (e.g. an X2 interface or a corresponding interface) to all the other network nodes in the same RANA to facilitate page distribution.

However, this may be difficult or impossible as compared to the idle state paging in LTE, where the node initiating the paging, i.e. the MME, already has knowledge and the necessary interfaces to all the network nodes that should be involved in the paging. Moreover, the set of network nodes belonging to a RANA may change over time, such as when network nodes are added, removed, relocated or reconfigured. It is thus a problem that a paging message may not be transmitted from one or more network nodes in a paged RANA because of inadequate knowledge about which network nodes currently belong to the RANA.

SUMMARY

It is an object of embodiments described herein to address at least some of the problems and issues outlined above. It is possible to achieve this object and others by using methods a wireless device and a first network node as defined in the attached independent claims.

According to one aspect, a method is performed by a wireless device for supporting distribution of paging messages within a Radio Access Network Area, RANA, of a wireless network. In this method, the wireless device collects RANA related information from network nodes visited by the wireless device, the RANA related information indicating which RANAs are supported by the respective network nodes. The wireless device further extracts from the collected RANA related information, a list of network nodes that support a RANA, and sends the extracted list of network nodes to a first network node to enable said distribution of paging messages by the first network node within the RANA.

According to another aspect, a wireless device is arranged to support distribution of paging messages within a Radio Access Network Area, RANA, of a wireless network. The wireless device is configured, e.g. by means of a collecting unit, to collect RANA related information from network nodes visited by the wireless device, where the RANA related information indicates which RANAs are supported by the respective network nodes. The wireless device is also configured, e.g. by means of a logic unit and a sending unit, respectively, to extract from the collected RANA related information, a list of network nodes that support a RANA, and to send the extracted list to a first network node to enable said distribution of paging messages by the first network node within the RANA.

According to another aspect, a method is performed by a first network node for performing distribution of a paging message within a Radio Access Network Area, RANA, of a wireless network. In this method, the first network node receives from a wireless device, a list of network nodes that support a RANA. Such a list may be received from wireless devices at several occasions, e.g. on a regular basis. The first network node further performs distribution of the paging message to the network nodes supporting the RANA according to the received list, as an instruction to perform radio transmission of the paging message.

According to another aspect, a first network node is arranged to perform distribution of a paging message within a Radio Access Network Area, RANA, of a wireless network. The first network node is configured, e.g. by means of a receiving unit and a distribution unit, respectively, to receive from a wireless device, a list of network nodes that support a RANA, and to perform distribution of the paging message to the network nodes supporting the RANA according to the received list, as an instruction to perform radio transmission of the paging message.

The above methods, wireless device and first network node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
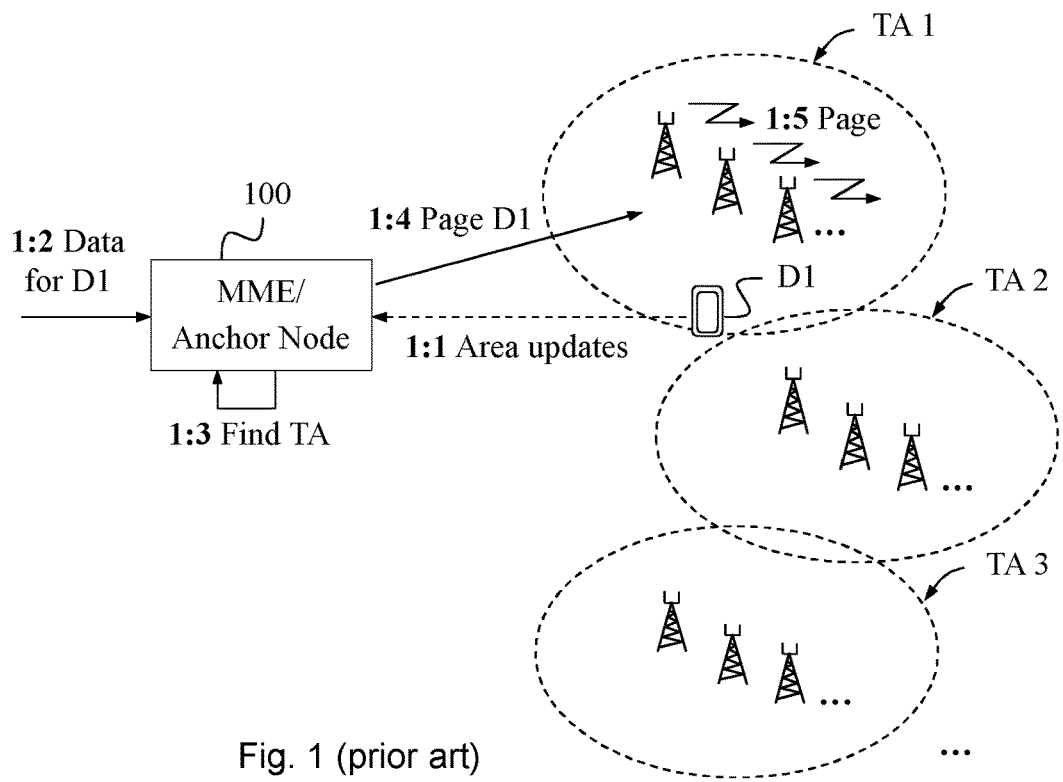
FIG. 1 is a communication scenario illustrating a conventional procedure for paging a wireless device in a wireless network, according to the prior art.

Briefly described, a solution is provided to enable efficient and accurate distribution of paging messages to be transmitted over radio from network nodes of at least one RANA in a wireless network. In particular, the solution may be used to assist a network node to distribute a paging message to virtually all network nodes that currently belong to and support a particular RANA, even when there is no central node corresponding to the above-described MME which has RANA information that is up-to-date and distributes paging messages. This can be accomplished by employing a number of wireless devices which are configured to collect RANA information from network nodes when visited by the wireless devices, and to supply requested RANA information to any network node as a basis for distributing paging messages.

When a network node receives data e.g. from a core network, which data is addressed to a wireless device being likely located somewhere in a certain RANA N, it is assumed in this solution that the network node needs to find preferably all other network nodes that support, i.e. belong to, RANA N in order to distribute a paging message to them for radio transmission across RANA N. The expected whereabouts of wireless devices in the wireless network may be generally maintained based on tracking area updating messages or RANA update messages or the like from the wireless devices in the regular manner described above, e.g. by suitable functionality in the core network. Such location information may thus be available with the accuracy level of at least one RANA.

Having received the data to be transmitted to the wireless device, the network node will search for a network node from which the wireless device can properly receive radio signals and detect a paging message for establishing a session where the data can be transmitted to the wireless device. At this point, the data receiving network node therefore needs to know virtually all network nodes that currently support the RANA N so that the paging message can be distributed to these network nodes for radio transmission over their respective coverage areas, thus covering the entire coverage area of RANA N.

The term "RANA information" is used herein for short which refers to information about which network nodes support one or more specific RANAs. The RANA information may also include contact information that can be used for establishing connections with the network nodes. In order to have accurate knowledge of all network nodes supporting the RANA N, this solution enables the data receiving network node to obtain such information from one or more wireless devices that have collected RANA information from various network nodes over time as follows.

Whenever a wireless device visits a network node, e.g. when being connected to a serving network node for communicating data and/or messages, the network node can take the opportunity to send information to the wireless device about a RANA which is supported by the network node, herein referred to as RANA information. For example, the wireless device may receive the RANA information by dedicated signaling from the visited network node or when broadcasted from the visited network node which can be received even in non-connected state.

In this way, the wireless device can collect such RANA information from a substantial number of network nodes that the wireless device happens to visit over time. Each wireless device can then provide their collected RANA information to any network node in the wireless network that needs to identify which network nodes a paging message should be distributed to whenever paging is performed across a RANA. This "reporting" of RANA information may be done by the wireless device upon request or periodically, e.g. according to a preconfigured reporting scheme.

If the wireless device moves around to a great extent and visits a large number of network nodes, it is able to build a substantial collection of RANA supporting network nodes quite rapidly. On the other hand, a wireless device that has a very limited and regular moving pattern will not be able to collect much RANA information and such a device may be deemed unsuitable for this procedure. For example, certain wireless devices that are expected to move around to a great extent across various areas may be appointed to operate in the manner described herein. However, the solution is not limited to any such characteristics of the wireless device and any wireless device could be used as described herein.

It is an advantage of this solution that distribution of a paging message can be made locally by the network nodes themselves in an efficient manner, without using any central paging distribution node such as the MME which may not be implemented in some types of networks such as 5G and evolved LTE networks. Another advantage is that the solution ensures that the network nodes that support a particular RANA can be identified with great accuracy and reliability by means of the obtained RANA information which can be kept up-to-date by frequently obtaining RANA information collected by various wireless devices. Thereby, any network node in the RANA is able to distribute the paging message to all other network nodes that support the RANA, based on RANA information collected by the wireless devices.

An example of how the solution may be employed for supporting distribution of paging messages within a RANA of a wireless network, will now be described with reference to a communication scenario illustrated in FIG. 2. In this scenario, a wireless network comprises multiple RANAs of which only two are shown, denoted RANA 1 and RANA 2. Each RANA is supported by a set of network nodes in the sense that when a paging message is to be transmitted across a particular RANA in order to reach a paged wireless device, each network node that supports that RANA needs to transmit the paging message so that the wireless device has a chance to receive the paging message regardless of where the device is located within the RANA. If the wireless device is not in the paged RANA, the paging message may need to be distributed across a larger area including one or more further RANAs, which is however not illustrated in this figure.

Figure 2:
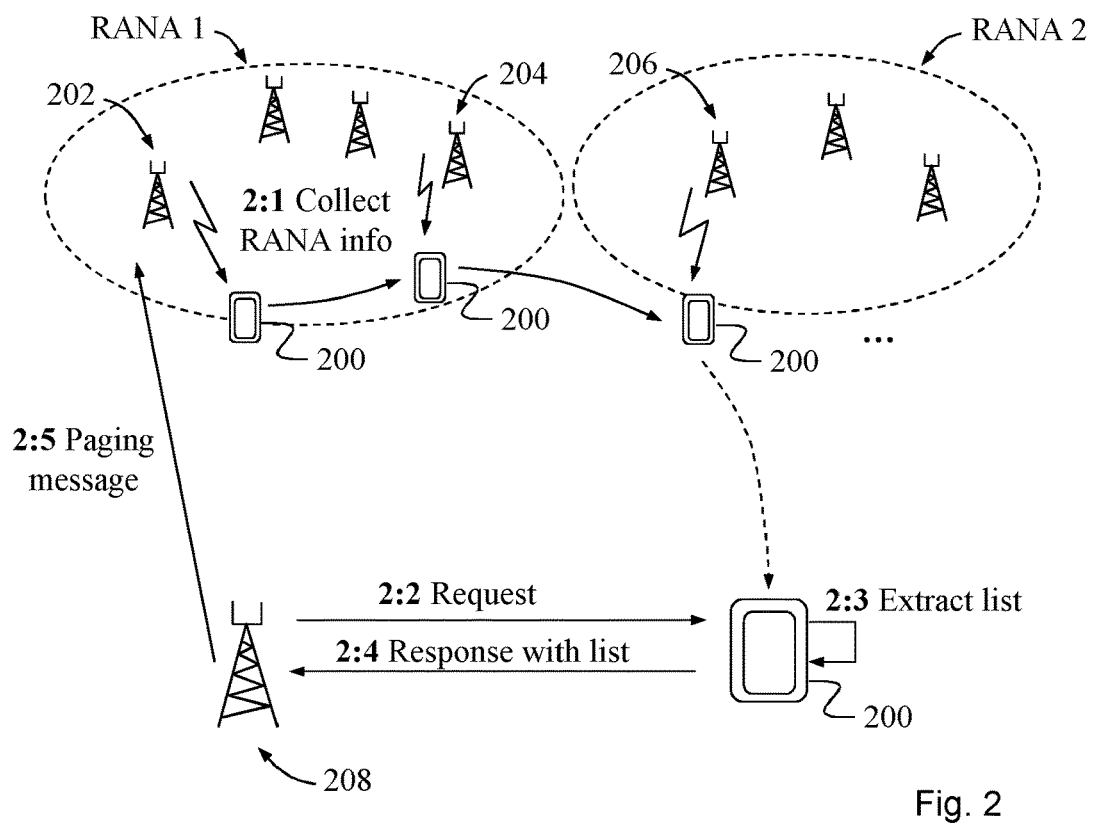
FIG. 2 is a communication scenario illustrating an example of how a wireless device may operate to support distribution of paging messages in a wireless network, according to some possible embodiments.

In FIG. 2, a wireless device 200 moves around in the network and visits a succession of network nodes at various occasions including network nodes 202 and 204 that support RANA 1, and network node 206 that supports RANA 2. Naturally, the wireless device 200 may in reality visit a much larger number of network nodes over time and only three network nodes are shown to be visited here for simplicity. In this description the term "visit" indicates that the wireless device 200 is generally able to receive information from the network node when being either in the connected state or the non-connected idle or dormant state.

When the wireless device 200 visits a network node, it collects RANA information from the visited network node, in this case successively from nodes 202, 204 and 206, as schematically indicated by an action 2:1. This action may be performed at any time "in the background" whenever the wireless device 200 can receive RANA information from a network node. The wireless device 200 may also revisit a network node a second time from which it has received RANA information earlier, and updated RANA information may be collected the second time.

The RANA related information collected from each network node thus indicates which RANA or RANAs are supported by the respective network node. For example, a network node may support only one RANA or more than one RANA at the same time, which means that two adjacent RANAs are supported by different parts of the network node's coverage area, e.g. different cells or different sectors, or the two RANAs may have partly overlapping coverage in an area served by such a network node. The collected RANA information may include contact information of the respective network nodes, e.g. in the form of an IP address or a Fully Qualified Domain Name, FQDN, or some type of identifier used specifically for identifying RANAs.

When the wireless device 200 is connected to a network node 208 that in this case belongs to RANA 1, a next action 2:2 illustrates that the wireless device 200 receives a request for RANA information from the network node 208. A similar request may be sent from the network node 208 to other wireless devices as well, so that the network node 208 can obtain as much RANA information as possible. For example, the request may be a general request for any RANA information that the wireless device 200 has collected from network nodes in various RANAs it has visited. Alternatively, the request may be a specific request for RANA information that the wireless device 200 has collected from network nodes in one or more particular RANAs, in this case RANA 1 which is the network node's 208 own RANA.

In a further action 2:3, the wireless device 200 extracts or generates from the collected RANA related information, a list of network nodes that support the requested RANA(s).

This list may thus be either a complete list of all network nodes of which the wireless device 200 has collected information, if the request in action 2:2 was a general request for any RANAs, or a limited list of network nodes supporting the network node 208 own RANA if the request in action 2:2 was a specific request for RANA 1. The wireless device 200 then returns the extracted list to the requesting network node 208, in an action 2:4.

A final action 2:5 illustrates that the network node 208 may use the RANA information obtained from device 200, and possibly from other devices as well, for finding the network nodes belonging to RANA 1 and for distributing a paging message to these network nodes. The actual distribution of the paging message is somewhat outside the scope of this disclosure and will therefore not be described here in any detail. One option is that the network node 208 establishes a connection with each network node in RANA 1 based on contact information comprised in the obtained RANA information, and sends the paging message to the network nodes over said connections as an instruction to perform radio transmission of the paging message. Another option is that the paging message is distributed in a multi-hop fashion from the network node 208 via one or more intermediate network nodes to the remaining network nodes in RANA 1, to which the network node 208 does not have a direct connection.

An example of how the solution may be employed in terms of actions performed by a wireless device, such as the wireless device 200 of FIG. 2, for supporting distribution of paging messages within a RANA of a wireless network, will now be described with reference to the flow chart in FIG. 3. Reference will also be made, without limiting or losing applicability of the features described, to elements involved in the example shown in FIG. 2.

Figures 3, 4A, 4B:
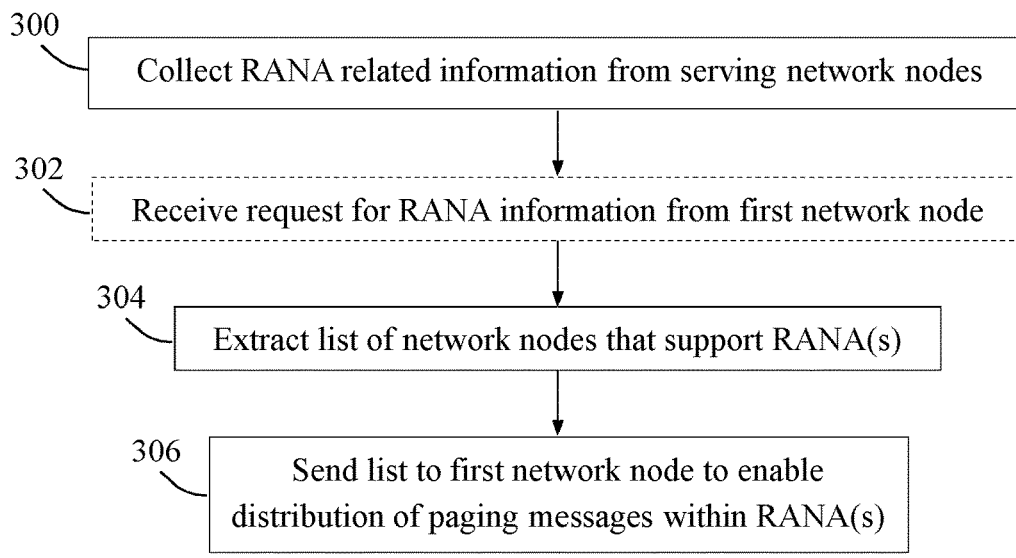
FIG. 3 is a flow chart illustrating a procedure in a wireless device, according to further possible embodiments.
FIG. 4A is a first example of a list with network nodes supporting a requested RANA, in accordance with embodiments herein.
FIG. 4B is a second example of a list with network nodes supporting three requested RANAs, in accordance with embodiments herein.

The procedure illustrated by FIG. 3 can thus be used to accomplish the functionality and benefits described above. In this description, the term "Radio Access Network Area, RANA" should be understood as an area comprised of cells or similar coverage areas which are served by network nodes supporting the RANA so that a wireless device can be paged in the RANA by radio transmission of a paging message from the network nodes of the RANA. "Tracking area" and "Paging area" are examples of alternative terms that could also be used herein.

The actions of FIG. 3 will first be briefly outlined and then some example embodiments that could optionally be employed will also be described and explained. A first action 300 illustrates that the wireless device 200 collects RANA related information from network nodes 202, 204, 206 visited by the wireless device 200, which corresponds to action 2:1 in FIG. 2. The collected RANA related information indicates which RANAs are supported by the respective network nodes. The collected RANA related information may also comprise some suitable contact information that can be used for establishing a connection to the respective network node, such as an IP address or a Fully Qualified Domain Name, FQDN that can be resolved into an IP address via a Domain Name System, DNS.

A next optional action 302 illustrates that the wireless device 200 may receive a request from a first network node 208, for information about which network nodes support one or more specified RANAs, which corresponds to action 2:2 in FIG. 2. In a further action 304, the wireless device 200 extracts from the collected RANA related information, a list of network nodes that support a RANA, which could be the one or more RANAs requested in action 302. Action 304 corresponds to action 2:3 in FIG. 2. Throughout his description, the term "a RANA" is not limited to only a single RANA but it should be seen as at least one RANA thus not excluding two or more RANAs when applicable.

A final action 306 illustrates that the wireless device 200 sends the extracted list of network nodes to a first network node 208, e.g. in response to a request therefrom if action 302 was performed, where action 306 corresponds to action 2:4 in FIG. 2, to enable said distribution of paging messages by the first network node 208 within the RANA, which corresponds to action 2:5 in FIG. 2.

FIG. 4A is a table illustrating a first example of the above-mentioned list of network nodes sent by the wireless device 200 to the first network node 208 in action 306 or action 2:4. In this example, the first network node 208 has requested information about which network nodes support RANA 1. It is thus shown that a set of network nodes 11, 12, 13, . . . support RANA 1 which is indicated by a suitable RANA identifier, or RANA ID. The list also includes contact information for each network node, which can be used for establishing a connection to the respective network nodes. The contact information is schematically denoted C11, C12, C13 for the respective network nodes 11, 12, 13.

FIG. 4B is a table illustrating a second example of the above-mentioned list of network nodes sent by the wireless device 200 to the first network node 208. In this example the first network node 208 has requested information about which network nodes support three different RANAs including RANA 1, RANA 2 and RANA 3. The request could also refer to any RANAs for which the wireless device 200 has collected RANA information. The list in this case indicates that a first set of network nodes 11, 12, 13, . . . support RANA 1, a second set of network nodes 21, 22, 23, . . . support RANA 2, and that a third set of network nodes 31, 32, 33, . . . support RANA 3. The list also includes respective contact information, generally denoted "Cxx", for the network nodes, which can be used for establishing a connection to the respective network nodes.

Some non-limiting example embodiments that can be used in the procedure of FIG. 3, will now be described. In one example embodiment, the collected RANA related information may comprise contact information of the respective network nodes, which was also mentioned above. In another example embodiment, the contact information may be included in the list sent to the first network node 208. If so, further example embodiments may be that the contact information comprises a network node identifier, such as an IP address, or a Fully Qualified Domain Name, FQDN, of the respective network nodes in the list, or an identifier from which it is possible to derive a FQDN of the respective network nodes in the list. The FQDN can be resolved into an IP address via a DNS node.

In another example embodiment, the list of network nodes may be extracted and sent to the first network node 208 in response to receiving from the first network node 208 a request for information about which network nodes support the RANA(s), which was described above for action 302. In another example embodiment, the list of network nodes may indicate a plurality of RANAs and network nodes supporting each of the RANAs. The number of RANAs in the list may depend on whether the RANAs were specifically requested by the first network node 208 according to the previous embodiment, or it may depend on which network nodes the wireless device has visited and collected RANA related information from.

In another example embodiment, the collected RANA related information may be sent to network nodes in the wireless network at predetermined intervals, e.g. periodically according to a preconfigured reporting scheme.

In further example embodiments, the collected RANA related information may be sent to network nodes in the wireless network triggered by an event, which event may comprise that the size of the collected RANA related information (e.g. measured by the number of included network nodes) has exceeded a configured threshold, or that a certain amount of RANA related information (e.g. measured by the number of included network nodes) has been collected since the last time the wireless device sent a report of RANA related information to the network.

In further example embodiments, the RANA related information may be collected when broadcasted by the respective network nodes or by requesting the RANA related information from the respective network nodes. For example, the RANA related information may be transmitted to the device in dedicated signalling, e.g. in response to such a request from the device. In another example embodiment, the RANA related information may comprise a RANA identifier of each supported RANA.

In further example embodiments, the wireless device may have been configured by a node in the wireless network to perform the procedure described above for FIG. 3. For example, this node may be any of a core network node, an Operation & Maintenance, O&M, node, and a network node providing radio access.

An example of how the solution may be employed in terms of actions performed by a first network node, such as the network node 208 of FIG. 2, for performing distribution of a paging message within a RANA of a wireless network, will now be described with reference to the flow chart in FIG. 5. Reference will also be made, without limiting or losing applicability of the features described, to elements involved in the example shown in FIG. 2.

Figure 5:
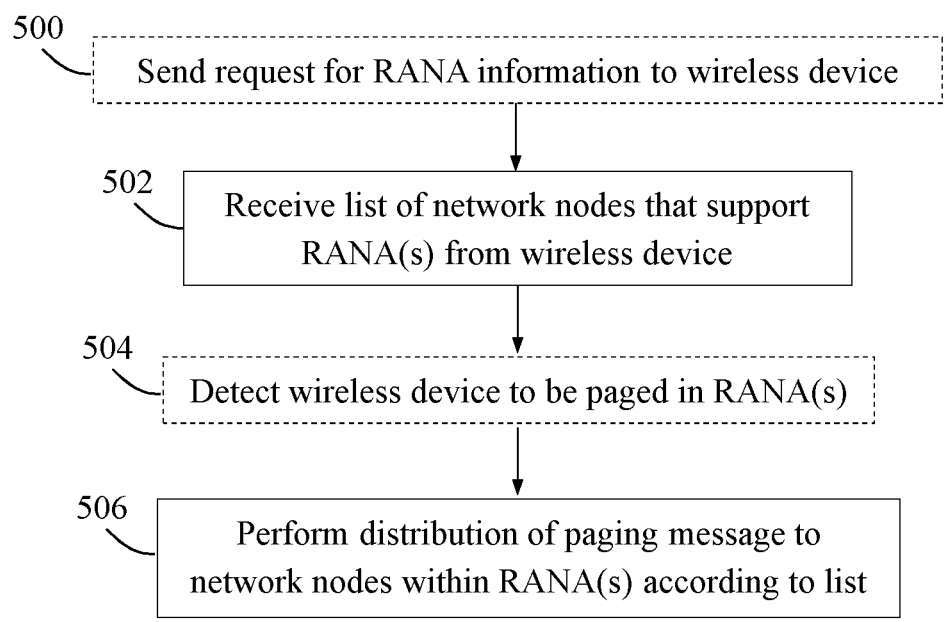
FIG. 5 is a flow chart illustrating a procedure in a first network node, according to further possible embodiments.

The procedure illustrated by FIG. 5 can thus be used to accomplish the functionality and benefits described above. The actions of FIG. 5 will first be briefly outlined and then some example embodiments that could optionally be employed will also be described and explained. A first optional action 500 illustrates that the first network node 208 may send a request for RANA related information to a wireless device 200 that may currently be connected to the first network node 208, which corresponds to action 2:2 in FIG. 2 and action 302 in FIG. 3. This request may be a general request for information about any RANAs or a specific request for one or more RANAs, which was also described above for action 302.

In a next action 502 the first network node receives from the wireless device 200, a list of network nodes that support a RANA which could be one or more RANAs that may have been specifically requested by the wireless device 200 in action 500. Action 502 corresponds to action 2:4 in FIG. 2 and action 306 in FIG. 3. A next optional action 504 illustrates that the first network node 208 may detect that a wireless device needs to be paged in one or more RANAs, e.g. when receiving data to be transmitted to that wireless device. It should be noted that the wireless device that needs to be paged is likely not the same as the device 200 that sent the list in action 502, although this possibility should not be ruled out.

A final action 506 illustrates that the first network node 208 performs distribution of a paging message to the network nodes supporting the RANA according to the received list, as an instruction to perform radio transmission of the paging message. This action corresponds to action 2:5 in FIG. 2. As mentioned above, the network node 208 may establish a connection with each network node in the RANA based on contact information comprised in the obtained RANA information. The paging message can then be sent to the network nodes over the established connections.

Some non-limiting example embodiments that can be used in the procedure of FIG. 5, will now be described. In one example embodiment, the list of network nodes may include contact information of the respective network nodes, which was also mentioned above. In further example embodiments, the contact information may in that case comprise a network node identifier, such as an IP address or a Fully Qualified Domain Name, FQDN, of the respective network nodes in the list, or an identifier from which it is possible to derive a FQDN of the respective network nodes in the list.

In another example embodiment, the list of network nodes received in action 502 may indicate a plurality of RANAs and network nodes supporting each of the RANAs, which was also described above for actions 2:3 and 2:4. In another example embodiment, the list of network nodes may be received in response to a request sent from the first network node 208 to the wireless device 200 as of action 500.

Figure 6:
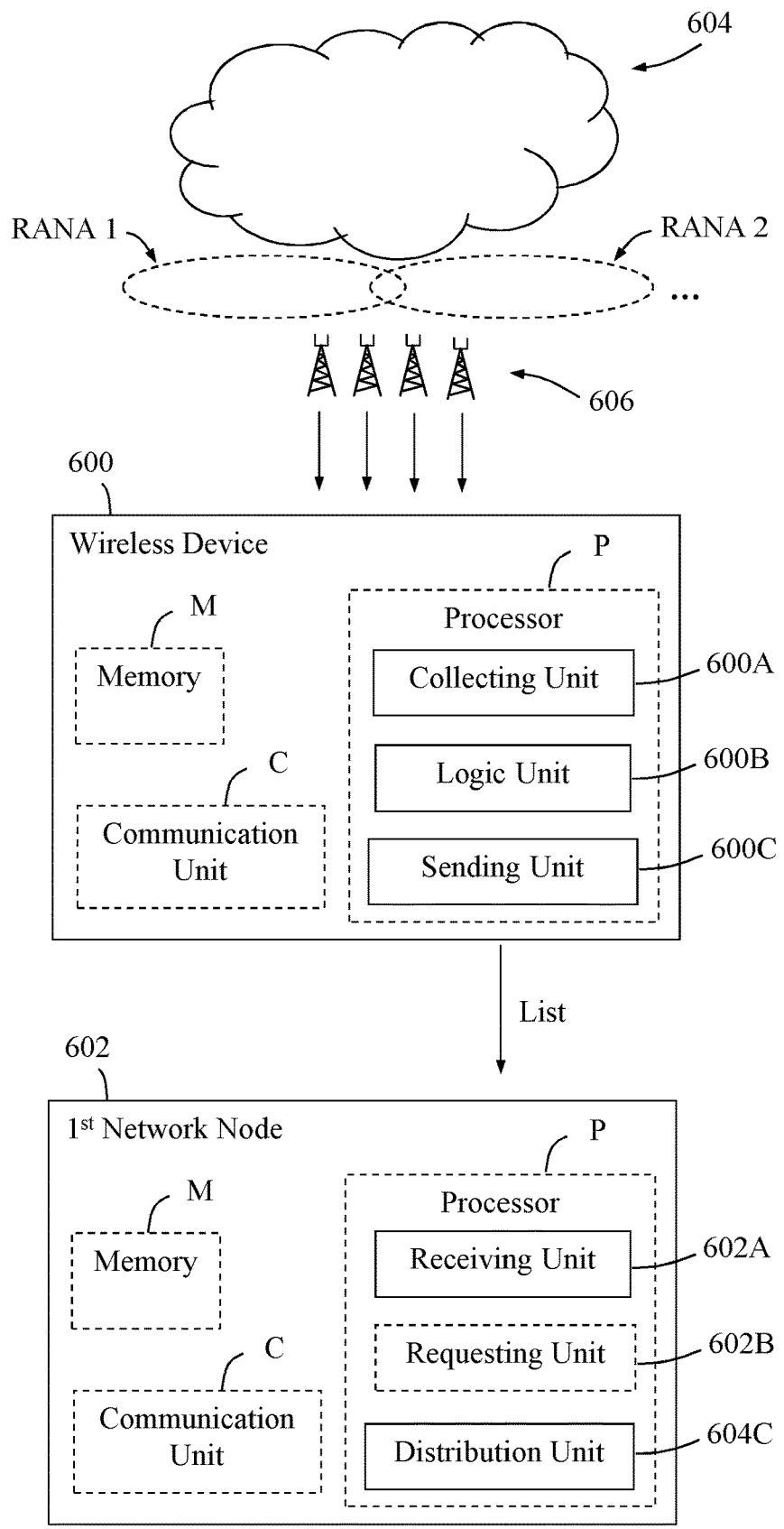
FIG. 6 is a block diagram illustrating a wireless device and a first network node in more detail, according to further possible embodiments.

The block diagram in FIG. 6 illustrates a detailed but non-limiting example of how a wireless device 600 and a first network node 602, respectively, may be structured to bring about the above-described solution and embodiments thereof. In this figure, the wireless device 600 and the first network node 602 may be configured to operate according to any of the examples and embodiments of employing the solution as described above, where appropriate, and as follows. Each of the wireless device 600 and the first network node 602 is shown to comprise a processor "P", a memory "M" and a communication circuit "C" with suitable equipment for transmitting and receiving messages in the manner described herein.

The communication circuit C in each of the wireless device 600 and the first network node 602 thus comprises equipment configured for communication with each other over a radio interface using a suitable protocol for the communication depending on the implementation. The solution is however not limited to any specific types of protocols.

The wireless device 600 comprises means, e.g. in the form of units or the like, configured or arranged to perform at least some of the actions of the flow chart in FIG. 3 in the manner described herein. Further, the first network node 602 comprises means, e.g. in the form of units or the like, configured or arranged to perform at least some of the actions of the flow chart in FIG. 5 in the manner described above. These actions and procedures may be performed by means of functional units in the respective processor P in the wireless device 600 and the network node 602 as follows.

The wireless device 600 is arranged to support distribution of paging messages within a Radio Access Network Area, RANA, of a wireless network 604. The wireless device 600 is configured to collect RANA related information from network nodes 606 visited by the wireless device 600, the RANA related information indicating which RANAs are supported by the respective network nodes 606. This operation may be performed by a collecting unit 600A in the wireless device 600, e.g. in the manner described for action 300.

The wireless device 600 is further configured to extract from the collected RANA related information, a list of network nodes that support a RANA, which could be one or more RANAs. This operation may be performed by a logic unit 600B in the wireless device 600, e.g. in the manner described for action 304.

The wireless device 600 is also configured to send the extracted list to a first network node 602 to enable said distribution of any paging messages by the first network node 602 within the RANA. This operation of sending the list may be performed by a sending unit 600C in the wireless device 600, e.g. in the manner described for action 306. Thereby, the network node 602 is enabled to perform distribution of a paging message directed to a wireless device that should receive some data or message.

The first network node 602 is arranged to perform distribution of paging messages within a Radio Access Network Area, RANA, of a wireless network. The first network node 602 is configured to receive from a wireless device 600, a list of network nodes that support a RANA. This operation may be performed by a receiving unit 602A in the network node 602, e.g. as described above for action 502. The first network node 602 may be further configured to receive the list of network nodes in response to a request sent from the first network node 602 to the wireless device 600. This request may be generated by a requesting unit 602B in the network node 602, e.g. as described above for action 500.

The first network node 602 is also configured to perform distribution of a paging message to the network nodes supporting the RANA according to the received list, as an instruction to perform radio transmission of the paging message. This operation may be performed by a distribution unit 602C in the network node 602, e.g. as described above for action 506.

It should be noted that FIG. 6 illustrates various functional modules in the wireless device 600 and the first network node 602, respectively, and the skilled person is able to implement these functional modules in practice using suitable software and hardware. Thus, the solution is generally not limited to the shown structures of the wireless device 600 and the network node 602, and the functional units therein may be configured to operate according to any of the features and embodiments described in this disclosure, where appropriate.

The functional modules 600A-C and 602A-C described above can be implemented in the wireless device 600 and the network node 602, respectively, by means of program modules of a respective computer program comprising code means which, when run by the processor P causes the wireless device 600 and the network node 602 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the wireless device 600 and the network node 602 in the form of a memory having a computer readable medium and being connected to the processor P. The computer program product or memory M in each of the wireless device 600 and the network node 602 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective wireless device 600 and network node 602.

The solution described herein may be implemented in each of the wireless device 600 and the first network node 602 by a computer program comprising instructions which, when executed on at least one processor, cause the at least one processor to carry out the actions according to any of the above embodiments, where appropriate. The solution may also be implemented at each of the wireless device 600 and the network node 602 in a carrier containing the above computer program, wherein the carrier is one of an electronic signal, optical signal, radio signal, a computer program storage product, or a computer readable storage medium.

Advantages of the above-described solution and its embodiments include that distribution of a paging message can be handled internally within a RANA without using any central paging distribution node such as an MME. Further, the network nodes that support the RANA can be identified with great accuracy and reliability by means of the list sent by the wireless device with such network nodes that support the RANA. Thereby, any network node in the wireless network obtaining such a list from one or more wireless devices is able to perform distribution of a paging message across the RANA in the manner described above.

Some further examples and features of the above-described solution and its embodiments will now be discussed.

In this solution a device assisted mechanism is thus used to convey RANA information to network nodes. To this end, wireless devices record RANA IDs and some kind of network node identifier of the network nodes they visit. This may be done by default, possibly deleting old recorded data that has expired, or it may be done only by selected wireless devices which are configured to operate in this manner. Upon request from the above-described first network node, a wireless device provides its recorded RANA information, or some selected part thereof, to the requesting network node. A network node would typically only request the wireless device to deliver information related to the RANA(s) the network node itself supports. However, the mechanism also allows retrieval of information related to other RANAs, e.g. in order to support subsequent page distribution across multiple RANAs. Through this mechanism the network nodes would gradually become aware of the other network nodes supporting the same RANA and optionally also other, reasonably close, RANAs. Alternatively, the network could configure the wireless device when to report this information e.g. periodically.

In order to establish a direct connection/interface to one of the network nodes learned this way, e.g. in order to form a full or partial mesh of connected network nodes, contact information needs to be retrieved for this network node. This could e.g. be based on DNS where a FQDN derived from a network node ID could be used in a query to the DNS node. Optionally, the contact information could also be recorded and provided by the wireless device. To support this mechanism for wireless devices in non-connected or dormant state, the contact information, e.g. in the form of an IP address, should be included in the RANA information collected from the network nodes, e.g. together with the RANA ID and/or a network node ID. For connected wireless devices, the contact information could be delivered through unicast or dedicated messaging, e.g. upon request from the wireless device, in the case where only a subset of the wireless devices are actively collecting such information.

The above-described solution may further be used by the first network node for retrieving a device context by using RANA information that has been obtained from various wireless devices in the manner described herein. For example, a device context of a particular wireless device may be needed in case the device is handed over to the first network node which context is used by the first network node for communication with the device after the handover has been completed. The use of a device context as such can be done in a regular manner which is however outside the scope of this disclosure. The term "device context" has been explained above.

This context retrieval may be enabled by a context identifier which may include an identifier of the network node storing the device context and a part identifying the context within the network node storing the context. The context identifier may be provided from the wireless device when it contacts the network, e.g. when responding to a paging message or when switching from dormant to active state.

In the case of paging, the context identifier may be included in the paging message which is distributed from the first network node to the network nodes taking part in the paging of the wireless device. The collected RANA information obtained by the first network node could in this case be used to translate the node ID part of the context identifier into an IP address or a FQDN that can be used for contacting the context storing network node and retrieving the device context therefrom.

While the solution has been described with reference to specific exemplifying embodiments, the description is generally only intended to illustrate the inventive concept and should not be taken as limiting the scope of the solution. For example, the terms "wireless device", "network node", "paging message", "Radio Access Network Area, RANA", and "RANA related information" have been used throughout this disclosure, although any other corresponding entities, functions, and/or parameters could also be used having the features and characteristics described here. The solution is defined by the appended claims.

The invention claimed is:

1. A method performed by a wireless device for supporting distribution of paging messages within a Radio Access Network Area, RANA, of a wireless network, the method comprising:
    collecting RANA related information from network nodes visited by the wireless device, the RANA related information indicating which RANAs are supported by respective ones of the network nodes, wherein the collected RANA related information comprises contact information for the respective network nodes, the contact information comprising a Fully Qualified Domain Name, FQDN, of each of the respective network nodes,
    extracting from the collected RANA related information, a list of network nodes that support a RANA, and
    sending the extracted list of network nodes to a first network node to enable said distribution of paging messages by the first network node within the RANA, wherein said contact information is included in the extracted list of network nodes sent to the first network node;
    wherein the contact information comprises an IP address; and
    wherein the list of network nodes is extracted and sent to the first network node in response to receiving from the first network node a request for information about which network nodes support the RANA(s).

2. A method according to claim 1, wherein the contact information comprises a network node identifier, or an identifier to derive a FQDN of each of the network nodes in the list.

3. A method according to claim 1, wherein the list of network nodes indicates a plurality of RANAs and network nodes supporting each of the RANAs.

4. A method according to claim 1, wherein the collected RANA related information is sent to network nodes in the wireless network when triggered by an event comprising any of:
    the size of the collected RANA related information has exceeded a predefined threshold, and
    a certain amount of RANA related information has been collected since the last time the wireless device sent RANA related information to the network.

5. A method according to claim 1, wherein the RANA related information is collected when broadcasted by the respective network nodes or by requesting the RANA related information from the respective network nodes.

6. A method according to claim 1, wherein the RANA related information comprises a RANA identifier of each supported RANA.

7. A method according to claim 1, wherein the wireless device has been configured by a node in the wireless network to perform the method, said node being any of a core network node, an Operation & Maintenance, O&M, node, and a network node providing radio access.

8. A method performed by a wireless device for supporting distribution of paging messages within a Radio Access Network Area, RANA, of a wireless network, the method comprising:
    collecting RANA related information from network nodes visited by the wireless device, the RANA related information indicating which RANAs are supported by respective ones of the network nodes, wherein the collected RANA related information comprises contact information for the respective network nodes, the contact information comprising a Fully Qualified Domain Name, FQDN, of each of the respective network nodes,
    extracting from the collected RANA related information, a list of network nodes that support a RANA, and
    sending the extracted list of network nodes to a first network node to enable said distribution of paging messages by the first network node within the RANA, wherein said contact information is included in the extracted list of network nodes sent to the first network node;
    wherein the contact information comprises an IP address; and
    wherein the collected RANA related information is sent to network nodes in the wireless network at predetermined intervals.

9. A wireless device arranged to support distribution of paging messages within a Radio Access Network Area, RANA, of a wireless network, the wireless device comprising:
    a processor configured to,
        collect RANA related information from network nodes visited by the wireless device, the RANA related information indicating which RANAs are supported by the respective network nodes, wherein the collected RANA related information comprises contact information for the respective network nodes, the contact information comprising a Fully Qualified Domain Name, FQDN of each of the respective network nodes, extract from the collected RANA related information, a list of network nodes that support a RANA, and send the extracted list to a first network node to enable said distribution of paging messages by the first network node within the RANA, wherein said contact information is included in the list sent to the first network node;

wherein the contact information comprises an IP address; and wherein the list of network nodes is extracted and sent to the first network node in response to receiving from the first network node a request for information about which network nodes support the RANA(s).

10. A method performed by a first network node for performing distribution of a paging message within a Radio Access Network Area, RANA, of a wireless network, the method comprising:

receiving from a wireless device, a list of network nodes that support a RANA, wherein the list of network nodes includes contact information for the respective network nodes, the contact information comprising a Fully Qualified Domain Name, FQDN, of each of the respective network nodes, and performing distribution of the paging message to the network nodes supporting the RANA according to the received list, as an instruction to perform radio transmission of the paging message;

wherein the contact information comprises an IP address; and wherein the list of network nodes is extracted and sent to the first network node in response to receiving from the first network node a request for information about which network nodes support the RANA(s).

11. A method according to claim 10, wherein the contact information comprises a network node identifier or an identifier to derive a FQDN of each of the network nodes in the list.

12. A method according to claim 10, wherein the list of network nodes indicates a plurality of RANAs and network nodes supporting each of the RANAs.

13. A method according to claim 10, wherein the list of network nodes is received in response to a request sent from the first network node to the wireless device.

14. A first network node arranged to perform distribution of a paging message within a Radio Access Network Area, RANA, of a wireless network, the first network node comprising:

a processor configured to, receive from a wireless device, a list of network nodes that support a RANA, wherein the list of network nodes includes contact information of the respective network nodes, the contact information comprising a Fully Qualified Domain Name, FQDN, of each of the respective network nodes, and perform distribution of the paging message to the network nodes supporting the RANA according to the received list, as an instruction to perform radio transmission of the paging message;

wherein the contact information comprises an IP address; and wherein the list of network nodes is extracted and sent to the first network node in response to receiving from the first network node a request for information about which network nodes support the RANA(s).

\* \* \* \* \*